United States Patent Office 3,578,624
Patented May 11, 1971

3,578,624
CLAY FILLED, SULFUR-CURED ELASTOMERS COMPOUNDED WITH HYDROXYL-TERMINATED BUTADIENE POLYMERS
Edward Fuller Cluff, Wilmington, Del., assignor to E. I. du Pont de Nemours and Company, Wilmington, Del.
No Drawing. Filed Apr. 1, 1969, Ser. No. 812,289
Int. Cl. C08c *11/14;* C08d *13/26*
U.S. Cl. 260—41.5                 10 Claims

ABSTRACT OF THE DISCLOSURE

An elastomeric composition comprising (a) a copolymer of at least one α-monoolefin, and at least one nonconjugated diene having at least one readily polymerizable double bond, (b) a hydroxyl-terminated liquid polymer containing at least 60% by weight of butadiene units, (c) a clay filler and (d) a sulfur curing system. The hydroxyl-terminated liquid polymer improves the physical properties of the vulcanizate produced therefrom.

BACKGROUND OF THE INVENTION

Elastomeric compositions made of clay filled, sulfur-curable copolymers of α-olefins and nonconjugated dienes (ODM) are used commercially to produce a variety of common articles such as appliance parts, garden hoses, auto floor mats and traffic cones. Many attempts have been made to improve these products by improving the physical properties of these elastomers principally by compounding the elastomer with various polymer additives such as cis-4-polybutadiene, epoxidized polybutadiene and butadiene/styrene copolymers. These attempts have provided improvements but because of the high commercial value attributed to these elastomers, there is a continuous effort to find other additives that are readily available, economical to use and in use provide a clay filled, sulfur-curable elastomer with improved physical properties over stocks compounded without a polymer additive.

SUMMARY OF THE INVENTION

Accordingly, this invention provides an elastomeric composition of:

(a) 100 parts by weight of a sulfur-curable copolymer of at least one α-monoolefin, and at least one nonconjugated diene with one readily polymerizable double bond;
(b) about 0.5 to 10 parts by weight of a hydroxyl-terminated, liquid polymer having at least 60 weight percent butadiene units present;
(c) about 50 to 300 parts by weight of a clay filler; and
(d) a sulfur curing system.

DETAILS OF THE INVENTION

The elastomeric composition of this invention is made with the ingredients described below.

The sulfur-curable copolymers are made from at least one α-monoolefin and at least one nonconjugated diene having one polymerizable double bond. For convenience, these copolymers will be referred to as ODM copolymers.

The α-monoolefins have the structure R—CH=CH$_2$, where R is H or C$_1$-C$_{16}$ alkyl, and have preferably straight chains. Representative α-monoolefins are ethylene, propylene, 1-butene, 1-hexene, 1-decene, and 1-octadecene.

The nonconjugated dienes can be open-chain or cyclic compounds. Preferably, only one of the double bonds is readily polymerizable. The open-chain dienes have only one terminal double bond and the following general structural formula:

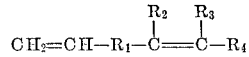

wherein R$_1$ is an alkylene radical, R$_2$ and R$_3$ are independently selected from the group consisting of hydrogen and alkyl radicals and R$_4$ is alkyl; and the R groups (R$_1$, R$_2$, R$_3$ and R$_4$) are selected so that the diene contains 6–22 carbon atoms. Representative open-chain dienes are 1,4-hexadiene; 1,9-octadecadiene; 6-methyl-1,6-heptadiene. Representative cyclic nonconjugated dienes include dicyclopentadiene, 5-alkenyl-substituted 2-norbornenes such as 5-(2′-butenyl) - 2 - norbornene, 5-alkylidene-2-norbornenes, such as 5-ethylidene-2-norbornene and 5-methylene-2-norbornene, 2-alkyl-2,5-norbornadienes and 1,5-cyclo-octadiene. The preferred diene is 1,4-hexadiene because of the outstanding physical properties of the copolymers prepared therefrom.

Representative sulfur-curable copolymers and procedures for making them are given in U.S. Pats. 2,933,480; 3,000,866; 3,063,973; 3,093,620; 3,093,621; 3,260,708 and French Pat. 1,521,726. EPDM copolymers, that is, terpolymers of ethylene, propylene and a nonconjugated diene having only one readily polymerizable double bond are preferred sulfur-curable copolymers in this invention. The ethylene copolymers should contain about 25 to 75 weight percent ethylene monomer units. Copolymers of 50 to 75 weight percent ethylene, 20 to 45 weight percent propylene and 1 to 10 weight percent, preferably 3 to 5 weight percent, 1,4-hexadiene are preferred and are employed in the enumerated examples; other copolymers described above can be substituted in the recipes set forth in the examples, and one skilled in the art can adjust the sulfur curing system to accommodate the substituted copolymer.

The hydroxyl-terminated liquid polymers useful in this invention have at least 60 weight percent butadiene units, and are present in the amount of about 0.5 to 10 parts per 100 parts of ODM copolymer. The hydroxyl-terminated butadiene polymer can be a hydroxyl terminated homopolymer or a copolymer, e.g., polybutadiene, poly(butadiene/styrene) or poly(butadiene/acrylonitrile), etc. and it is a liquid at the mixing temperature.

Usable hydroxyl-terminated butadiene polymers can be made by the following methods. One method entails polymerizing ethylenically unsaturated monomers, at least 60 weight percent of which are butadiene units, in the presence of free radicals to yield long hydrocarbon chains terminated at each end with the desired functional group or by groups convertible to the desired functional group by known chemical transformations. In the reaction products it is recognized that the main chain can contain side chains to a greater or lesser extent. Hydroxyl groups can be attached to the polymer chain by reaction with hydrogen peroxide. This process is in accordance with U.S. Pat. 3,392,118 (see Examples I and II).

Another process of producing hydroxyl-terminated butadiene polymers is the homogeneous anionic polymerization of conjugated hydrocarbon monomers such as butadiene, isoprene and 2-ethylbutadiene carried out in tetrahydrofuran. In addition, styrene which has an unusually active vinyl group may also be copolymerized with conjugated dienes. Initially lithium naphthalene or lithium metal (wire or ribbon is present) in the tetrahydrofuran. The polymerized product is a lithium-terminated diene polymer. The hydroxyl-terminated polymer is then produced by reacting the lithium-metal-terminated polymer with ethylene oxide and subsequently hydrolyzing the alkoxide obtained. This method is in accordance with U.S. Pat. 3,055,952.

A variety of clay fillers can be employed to prepare the compositions of this invention. A particularly valuable filler is kaolin clay. The kaolin clays generally used are aluminum silicates and can be hydrated or anhydrous, air floated or water washed and hard or soft, depending on the particle size and treatment during processing. Those skilled in the art understand that both the hard and soft kaolin clays can have identical crystalline structures yet differ markedly in their ability to reinforce an elastomeric stock. The difference in their reinforcing properties appears to depend upon the difference in their particle size distribution. A hard clay will noticeably reinforce an elastomeric stock as reflected by the various vulcanizate properties such as the modulus at 300% extension. In the case of hard clays a very high proportion, for example about 90%, of the particles are smaller than 2 microns. In contrast only about 60–70% of the soft clay particles are less than 2 microns. Commercially available hard kaolin clays include: "Champion Clay," "Crown Clay," "Harwick No. 1," "Suprex Clay"; soft kaolins include "Alumex R," "Hi-White R," "MacNames Clay," "Paragon Clay" and "PolyFil."

The principal physical characteristics of the clays which are preferred for use in the present invention are: (1) a specific gravity of about 2.6; (2) a 325-mesh screen residue below about 3.5%, preferably below about 0.35%; (3) absorbed moisture content not above about 1% (4) a particle size distribution wherein at least about 55% by weight of the particles are two microns or less in diameter; and (5) a pH (in water) of about 4.4 to 7, although specially prepared and treated clays may show pH values of 8 or higher. The finer the particle size, the better the filler responds in giving an improved vulcanizate.

The clay is present in an amount of about 50 to 300 parts per 100 parts of ODM copolymer preferably 80 to 200 parts.

In addition, the elastomer can be compounded with other conventional additives such as antioxidants, pigments, petroleum oils and the like. Carbon black can be present in the amount of 1 to 10 parts and preferably 4 to 6 parts per 100 parts of EPDM copolymer for purposes of color coding. These additives can be introduced at any time prior to extrusion or before curing begins.

The elastomeric compositions of this invention are cured with sulfur by conventional techniques. In general about 1.5 to 3 parts of sulfur are used for every 100 parts by weight of EPDM copolymer although it is to be understood that larger or smaller concentrations can be used. More sulfur is required as the concentration of hydroxyl-terminated polybutadiene is increased. Zinc oxide is generally present to assist the cure; however, other divalent metal oxides may also be used such as magnesium oxide, cadmium oxide, calcium oxide, lead oxide and barium oxide. Usable oxide concentrations range from about 3 to 10 parts by weight for every 100 parts of EPDM copolymer. Other compounds may be present to assist the cure such as accelerators, namely the thiazoles, dithiocarbamates, sulfenamides, thioureas, thiuram sulfides and their derivatives. The concentration of accelerator is generally in the range of 0.5 to 5 parts by weight.

Curing is accomplished by heating the compounded stock to a temperature ranging from about 140–225° C.; the higher the temperature the shorter the time needed. A frequently used temperature range for curing is 160–180° C. The optimum time and temperature will depend somewhat on the nature of the stock, its thickness and the properties desired.

Compositions of the present invention can be compounded with the aid of conventional equipment such as rubber roll mills or an internal mixer such as a Banbury mixer. Conventional procedures are used, care being taken to add the accelerators last at a stock temperature low enough to avoid the onset of curing.

The addition of a hydroxyl-terminated butadiene polymer to clay filled, sulfur-curable ODM copolymers according to this invention provides a method of improving the physical properties of the ODM vulcanizates. The hydroxy-terminated butadiene polymers are readily available and economical to use. Furthermore, the polymer additive has the advantage of being able to be blended mechanically either into the bulk ODM or into an ODM solution in a solvent.

The following examples illustrate this invention. All parts, percentages and proportions are by weight unless otherwise indicated.

The following ingredients are used in the examples:

(A) Copolymer A: An EPDM copolymer is made by copolymerizing ethylene with propylene and 1,4-hexadiene in solution in tetrachloroethylene in the presence of a coordination catalyst prepared in situ by mixing vanadium tetrachloride with diisobutyl aluminum monochloride in accordance with known procedures (see U.S. Pat. 2,933,480); hydrogen modification is employed during the preparation in accordance with U.S. Pat. 3,051,690. Copolymer A has a Mooney viscosity of about 45 (ML1+4/250° F.) and contains about 0.33 g.-mol of ethylenic unsaturation per kilogram of polymer. Copolymer A has the following monomer unit composition by weight: 63% ethylene; 33% propylene; 4% (total) 1,4-hexadiene. The inherent viscosity is about 2.2 measured at 30° C. in a solution of 0.1 gram of copolymer in 100 ml. of tetrachloroethylene.

(B) Polymer B is a homopolymer of 1,3-butadiene terminated by hydroxy groups. Its equivalent weight is 1250 and its viscosity (at 30° C.) is 50 poises. The 1,4- and 1,2-butadiene units are incorporated in the ratio 80:20. Polymer B contains about 18.5 mols of ethylenically unsaturated groups per kilogram. The hydroxyl content is 0.80 meq./gm.

Polymer B is commercially available as Poly B–D Resin R–45M from Sinclair Petrochemicals, Inc.

(C) Polymer C is the same as polymer B except that the equivalent weight is 1330 and its viscosity is 200 poises at 30° C.; the hydroxy content is 0.75 meq./gm. This polymer is commercially available as Poly B–D Resin R–15M from Sinclair Petrochemicals, Inc.

(D) Polymer D is a copolymer of 1,3-butadiene and acrylonitrile terminated by hydroxyl groups. Its equivalent weight is 1430 and its viscosity (at 30° C.) is 500 poises. The weight ratio of butadiene:acrylonitrile units is 85:15, 1,4- and 1,2-butadiene units being in the ratio 80:20. About 15.7 g.-mols of etyhlenically unsaturated groups are present per kilogram of polymer. The hydroxyl content is about 0.70 meq./gm.

Polymer D is commercially available as Poly B–D Resin CN–15 from Sinclair Petrochemicals, Inc.

(E) "Hard" Kaolin Clay: The clay ("Suprex" Clay, J. M. Huber Corp., New York) is an air-floated "hard" kaolin type characterized by the following equivalent analysis: 44–46% silica, 37.5–39.5% alumina, 1.5–2% iron oxide, and 1–2% titanium dioxide by weight, the ignition loss being 13.9–14.2% by weight. This analysis is not to be construed to indicate that the clay contains silica or alumina. The moisture content (maximum) is 1% by weight. The pH (in water) is about 4.5–5.5. This clay has a specific gravity of 2.60, a 325-mesh screen residue of 0.17% by weight, and the following particle size distribution (by weight): $10\mu$, 0.1%; $5–10\mu$, 2.8%; $4–5\mu$, 15%; $3–4\mu$, 2.3%; $2–3\mu$, 3.4%; $1–2\mu$, 9.0%; $0.5–1\mu$, 19.0%; $0–0.5\mu$, 61.9%.

Hot roll mixing procedure

This mixing procedure is used throughout the examples.

The EPDM copolymer is banded on conventional hot mill rolls and then the polymer additive is mixed in and dispersed. Thereafter, the clay, petroleum oil, zinc oxide and ammonium stearate are added and lightly hot mixed for 2 to 3 minutes with the mill rolls at 107° C. The rolls and the stock are then cooled, and the remaining ingredients are added.

After thorough mixing for about 10 minutes, the fully compounded stock is sheeted from the mill. The compounded stock is then press cured for 10 minutes and 20 minutes at 160° C.

Test procedures:

| | ASTM method |
|---|---|
| Mooney scorch | D-1646-67. |
| Stress-strain | D-412-66. |
| Compression set | D-395-67 (method B). |
| Shore A hardness | D-2240-64T. |

EXAMPLES 1, 2, 3, AND 4

Tables I and II below show the formulations used to prepare the elastomeric compositions of Examples 1 to 4, inclusive, along with the physical properties of the vulcanizates. The compositions are mechanical blends compounded on a hot rubber mill. Table I describes compositions of this invention containing hydroxyl-terminated polymers at the 2 parts per 100 parts of EPDM copolymer level while Table II describes compositions containing 3 parts of hydroxyl-terminated polymer per 100 parts of EPDM copolymer.

Table I and Table II also show the formulations used to prepare the elastomeric composition of Example A along with the physical properties obtained from the vulcanizate. Example A is not a part of this invention but is included to show comparative results between a clay filled, sulfur-curable EPDM copolymer containing a hydroxyl-terminated polymer according to the present invention with the same EPDM copolymer without any polymer additive. In Example A the tensile strength at break is high but the modulus is low and the compression set is high. These latter two properties indicate a poor cure. When such a composite is subjected to strain it tends to permanently deform beyond the point of practical acceptance.

TABLE I

| Formulation | Example 1 | Example 2 | A[1] |
|---|---|---|---|
| Copolymer A | 100 | 100 | 100 |
| Polymer B | 2 | | |
| Polymer C | | 2 | |
| "Hard" Kaolin clay ("Suprex" clay) | 120 | 120 | 120 |
| Paraffinic oil ("Sunpar 150") | 20 | 20 | 20 |
| Zinc oxide | 5 | 5 | 5 |
| Ammonium steraate | 1 | 1 | 1 |
| Tetramethylthiuram disulfide | 3 | 3 | 3 |
| 2-mercaptobenzothiazole | 1 | 1 | 1 |
| Sulfur | 2.5 | 2.5 | 2.5 |
| Mooney scorch at 121° C.: | | | |
|   Minutes to 5 pt. rise | 10.2 | 9 | 10.5 |
|   Minutes to 10 pt. rise | 12 | 11 | 12.5 |
|   Minimum (points) | 28.5 | 26 | 43.5 |
| Physical properties: | | | |
|   Cure 10 minutes at 160° C.: | | | |
|     100% modulus, p.s.i | 420 | 500 | 360 |
|     200% modulus, p.s.i | 800 | 1,150 | 50 |
|     300% modulus, p.s.i | 1,200 | 1,450 | 666 |
|     Tensile strength at break, p.s.i | 2,000 | 1,980 | 2,936 |
|     Elongation at break, percent | 510 | 380 | 680 |
|     Hardness, Durometer A | 65 | 67 | 67 |
|   Cure 20 minutes at 160° C.: | | | |
|     100% modulus, p.s.i | 590 | 625 | 486 |
|     200% modulus, p.s.i | 1,050 | 1,250 | 702 |
|     300% modulus, p.s.i | 1,425 | 1,700 | 900 |
|     Tensile strength at break, p.s.i | 2,150 | 2,200 | 3,243 |
|     Elongation of break, percent | 460 | 410 | 580 |
|     Hardness, Durometer A | 68 | 68 | 68 |
|     Compression set (22 hours at 70° C.), percent | 18 | 18 | 42 |

[1] Outside the scope of this invention.

TABLE II

| Formulation | Example 3 | Example 4 | A[1] |
|---|---|---|---|
| Copolymer A | 100 | 100 | 100 |
| Polymer B | 3 | | |
| Polymer C | | 3 | |
| "Hard" kaolin clay ("Suprex" Clay) | 120 | 120 | 120 |
| Paraffinic oil ("Sunpar 150") | 20 | 20 | 20 |
| Zinc oxide | 5 | 5 | 5 |
| Ammonium stearate | 1 | 1 | 1 |
| Tetramethylthiuram disulfide | 3 | 3 | 3 |
| 2-mercaptobenzothiazole | 1 | 1 | 1 |
| Sulfur | 2.5 | 2.5 | 2.5 |
| Mooney scorch at 121° C.: | | | |
|   Minutes to 5 pt. rise | 10 | 9.5 | 10.5 |
|   Minutes to 10 pt. rise | 11 | 11 | 12.5 |
|   Minimum (points) | 2.75 | 28.5 | 43.5 |
| Physical properties: | | | |
|   Cure 10 minutes at 160° C.: | | | |
|     100% modulus, p.s.i | 518 | 563 | 360 |
|     200% modulus, p.s.i | 1,148 | 1,148 | 540 |
|     300% modulus, p.s.i | 1,576 | 1,554 | 666 |
|     Tensile strength at break, p.s.i | 2,184 | 2,274 | 2,936 |
|     Elongation at break, percent | 480 | 480 | 680 |
|     Hardness, Durometer A | 68 | 69 | 67 |
|   Cure 20 minutes at 160° C.: | | | |
|     100% modulus, p.s.i | 608 | 585 | 486 |
|     200% modulus, p.s.i | 1,328 | 1,148 | 702 |
|     300% modulus, p.s.i | 1,644 | 1,554 | 900 |
|     Tensile strength at break, p.s.i | 2,262 | 2,049 | 3,243 |
|     Elongation at break, percent | 460 | 430 | 580 |
|     Hardness, Durometer A | 68 | 71 | 68 |
|     Compression set (22 hours at 70° C.), percent | 16 | 16 | 42 |

[1] Outside the scope of this invention.

EXAMPLES 5 AND 6

The elastomeric composition of Example 5 is prepared by blending a solution of 14.38 kg. of 3.05% (wt.:wt.) of EPDM Copolymer A in tetrachloroethylene with 13.7 g. of Polymer D. After the mixture is thoroughly stirred, the volatiles are removed by drum drying. Analysis of the resulting elastomeric composition by bromine titration (corrected for substitution) indicates the presence of 0.72 g.-mol of ethylenic unsaturation per kilogram of polymer (theory=0.75 g.-mol) equivalent to about 2.8 weight percent Polymer D in the mixture.

The above procedure is repeated for Example 6 except that Polymer D is replaced by Polymer B. The resulting composition has 0.77 g.-mol of ethylenic unsaturation per kilogram of polymer (theory=0.83 g.-mol) equivalent to about 2.6 weight percent Polymer B in the mixture.

The mixtures described above are separately compounded with the following ingredients on hot mill rolls according to the hot mixing procedure described above. The amounts indicated are parts by weight based on 100 parts of Copolymer A present.

"Hard" kaolin clay ("Suprex"—J. M. Huber Corp.) 120
Naphthenic petroleum oil _____ 20
Zinc oxide _____ 5
Stearic acid _____ 1
Tetramethylthiuram disulfide _____ 3
2-mercaptobenzothiazole _____ 1
Sulfur _____ 2.5

Following are the properties of the vulcanizates made by curing the above compounded compositions for 10 minutes and 30 minutes at 160° C.:

TABLE III

Cure cycle: 10 minutes at 160° C.

| | Example 5 | Example 6 |
|---|---|---|
| Stress-strain, 25° C.: | | |
|   Modulus at 100% extension, p.s.i | 590 | 540 |
|   Modulus at 200% extension, p.s.i | 1,080 | 1,100 |
|   Modulus at 300% extension, p.s.i | 1,450 | 1,520 |
|   Tensile strength, p.s.i | 2,050 | 2,150 |
|   Extension at break, percent | 520 | 500 |
|   Tensile set, percent | 40 | 36 |
| Hardness (Shore A) | 68 | 65 |
| Compression set (22 hours, 70° C.) (Method B), percent | 28 | 28 |

TABLE—Continued

Cure cycle: 30 minutes at 160° C.

| | | |
|---|---|---|
| Stress-strain, 25° C.: | | |
| Modulus at 100% extension, p.s.i. | 640 | 600 |
| Modulus at 200% extension, p.s.i. | 1,120 | 1,140 |
| Modulus at 300% extension, p.s.i. | 1,470 | 1,520 |
| Tensile strength, p.s.i. | 1,900 | 2,000 |
| Extension at break, percent | 435 | 435 |
| Tensile set, percent | 33 | 33 |
| Hardness (Shore A) | 69 | 65 |
| Compression set (22 hours, 70° C.) (Method B), percent | 19 | 19 |

I claim:

1. A sulfur vulcanizable elastomeric composition consisting essentially of:
   (a) a copolymer of at least one α-monoolefin and at least one nonconjugated diene with one readily polymerizable double bond; and
   (b) about 0.5 to 10 parts per 100 parts of copolymer of a hydroxyl-terminated liquid polymer having at least 60 weight percent butadiene units.

2. The composition of claim 1 in which the copolymer contains 25–75 weight percent ethylene units, 20–70 weight percent propylene units and 1–10 weight percent 1,4-hexadiene units.

3. The composition of claim 1 in which the copolymer contains 25–75 weight percent ethylene units, 20–70 weight percent propylene units and 1–10 weight percent 5-ethylidene 2-norbornene units.

4. A sulfur vulcanizable elastomeric composition consisting essentially of:
   (a) a copoylmer of at least one α-monoolefin and at least one nonconjugated diene with one readily polymerizable double bond;
   (b) about 0.5 to 10 parts per 100 parts of copolymer of a hydroxyl-terminated liquid polymer having at least 60 weight percent butadiene units;
   (c) about 50 to 300 parts per 100 parts of copolymer of a clay filler.

5. The composition of claim 4 in which the copolymer is an EPDM copolymer and the hydroxyl-terminated liquid polymer is present in the amount of about 1 to 4 parts per 100 parts of copolymer and the clay filler is present in the amount of 80 to 200 parts per 100 parts of copolymer.

6. The composition of claim 5 in which the hydroxyl-terminated polymer is selected from the group consisting of a hydroxyl-terminated butadiene homopolymer, a hydroxyl-terminated copolymer of butadiene/acrylonitrile or a hydroxyl-terminated copolymer of butadiene/styrene.

7. The composition of claim 5 in which the copolymer contains 25–75 weight percent ethylene units, 20–70 weight percent propylene units and 1–10 weight percent 1,4-hexadiene units.

8. The composition of claim 5 in which the copolymer contains 25–75 weight percent ethylene units, 20–70 weight percent propylene units and 1–10 weight percent 5-ethylidene 2-norbornene units.

9. The composition of claim 5 in which the clay filler is "hard" kaolin clay

10. A vulcanizate prepared by curing a composition of claim 5 with sulfur.

References Cited

UNITED STATES PATENTS

| | | | |
|---|---|---|---|
| 3,055,952 | 9/1962 | Goldberg | 260—94.7 |
| 3,344,105 | 9/1967 | McDonel et al. | 260—879 |
| 3,392,118 | 7/1968 | Isaacson et al. | 260—94.7 |

MORRIS LIEBMAN, Primary Examiner

H. H. FLETCHER, Assistant Examiner

U.S. Cl. X.R.

260—80.7, 85.3, 94.7, 879